(12) United States Patent
Sasaki

(10) Patent No.: US 6,714,373 B1
(45) Date of Patent: Mar. 30, 2004

(54) MAGNETIC DISK DEVICE HAVING AN IMPROVED SEEK CONTROL

(75) Inventor: Kiyotaka Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 09/603,221

(22) Filed: Jun. 26, 2000

(30) Foreign Application Priority Data

Sep. 30, 1999 (JP) .......................................... 11-279943

(51) Int. Cl.$^7$ .......................... G11B 15/12; G11B 5/596
(52) U.S. Cl. ........................ 360/63; 360/78.04; 711/112
(58) Field of Search ............................. 360/63, 75, 61, 360/111, 78.04, 48; 711/167, 112, 113, 114, 154; 369/34.01, 33.01

(56) References Cited

U.S. PATENT DOCUMENTS 5,422,761 A * 6/1995 Anderson et al. ............. 360/47
5,796,546 A * 8/1998 Sasamoto et al. ......... 360/78.04
6,369,968 B1 * 4/2002 Haines et al. ................. 360/53

FOREIGN PATENT DOCUMENTS

| JP | 61196323 | 8/1986 |
| JP | 04021021 | 1/1992 |
| JP | 06139715 | 5/1994 |

OTHER PUBLICATIONS

Patent Abstract of Japan, 61196323, Rotary Disk Control System, Yoshinobu et al., Aug. 30, 1986.
Patent Abstract of Japan, 04021021, Data Backup System For Semiconductor Disk Device, Kuniya, Jan. 24, 1992.

* cited by examiner

*Primary Examiner*—Andrew L. Sniezek
(74) *Attorney, Agent, or Firm*—Greer, Burns & Crain, Ltd.

(57) ABSTRACT

A magnetic disk device has an improved seek control in which a waiting time occurred in a first magnetic head while it is scanning a first track, is utilized efficiently and effectively by activating a second magnetic head such that the second magnetic head scans a second track during the waiting time of the first magnetic head.

9 Claims, 17 Drawing Sheets

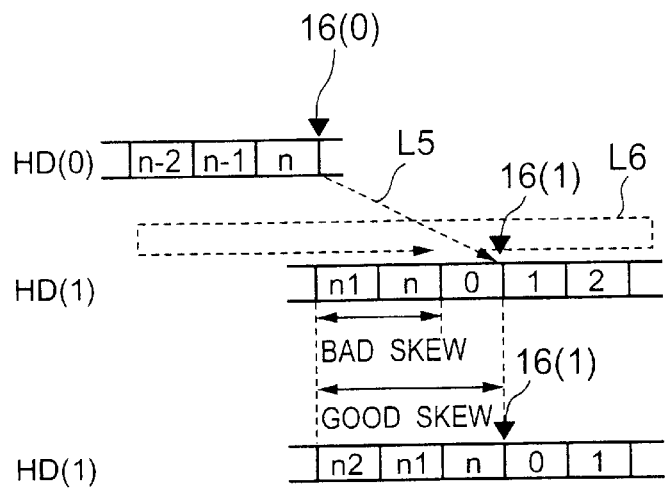
FIG.13A
FIG.13B
FIG.14
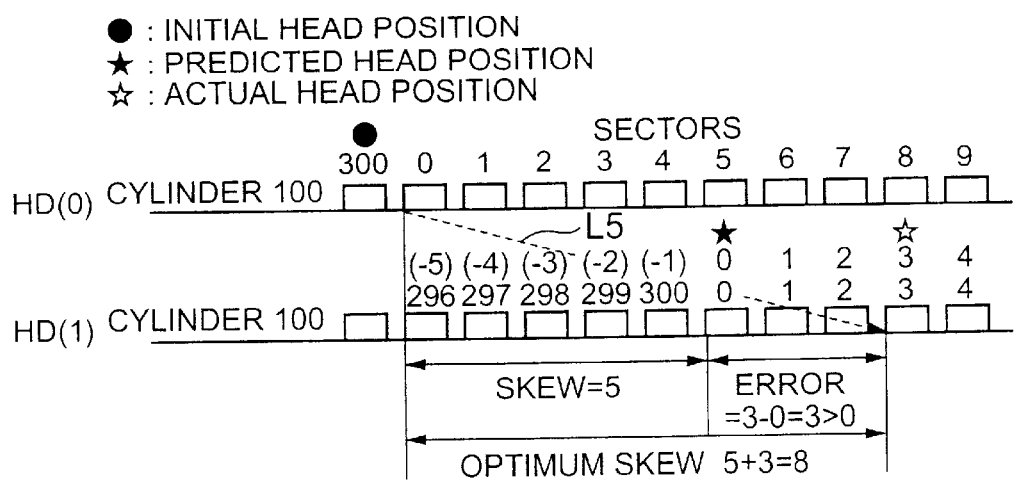

MAGNETIC DISK DEVICE HAVING AN IMPROVED SEEK CONTROL

CROSS-REFERENCE TO RELATED APPLICATION

The present application is based on Japanese priority application No.11-279943 filed on Sep. 30, 1999, the entire contents of which are hereby incorporated by reference.

BACKGROUND OF THE INVENTION

The present invention generally relates to magnetic storage of information and more particularly to a magnetic disk device having an improved seek control.

In a magnetic disk device that stores information on a rotary magnetic disk, it is necessary for a magnetic head to scan over a surface of the rotary magnetic disk, when reading information from the rotary magnetic disk, until it reaches a specific cylinder or a target track on which the information to be read out is recorded. Such a scanning operation of the magnetic head is called a seek operation and the duration for the seek operation is called a seek time. The smaller the seek time, the higher the access speed of the magnetic disk device.

On the other hand, in the actual magnetic storage device, there arises a case in which the magnetic head, carried on a swing arm at a tip end thereof, may reach the target track with a timing offset from the nominal timing for the portion or sector of the target track (target sector) on which the information to be reproduced is recorded. In such a case, the magnetic head cannot reproduce the information immediately from the target sector but has to wait on that track for another turn of the magnetic disk until the target sector that carries the information to be read out comes right underneath the magnetic head. However, the existence of such a waiting time decreases the reading speed of the magnetic disk device.

FIG.1 is a diagram showing the construction of a magnetic disk device 1 called a hard disk device according to a related art.

Referring to FIG. 1, the magnetic disk device 1 includes a magnetic disk 14 accommodated in an enclosure 10 having a cover 12 and stores information on the magnetic disk 14 along concentric tracks or cylinders defined thereon. The magnetic disk 14 is mounted on a spindle motor 18 for rotation, and a floating magnetic head 16 scans over the surface of the magnetic disk 14. The magnetic head 16 is mounted at an end of a swing arm 24, wherein the arm 24 is connected to a voice coil motor 20 and the voice coil motor 20 actuates the arm 24 for the swinging motion. With the swinging motion of the arm 24 thus caused by the voice coil motor 20, the magnetic head 16 scans over the surface of the magnetic disk 14 generally in a radial direction thereof. Thereby, the magnetic head 16 is controlled so as to trace a desired track on the magnetic disk 14.

FIGS. 2A and 2B show the magnetic disk 14 respectively in a plan view and in a cross-sectional view.

Referring to FIG. 2A, it can be seen that there are a number of concentric tracks 30 formed on a magnetic recording surface 26 of the magnetic disk 14, wherein the magnetic recording surface 26 is formed on both sides of the magnetic disk 14. Each of the tracks is divided into a number of sectors 28, and the magnetic head 16 scans over the magnetic recording surface 26 so as to record or reproduce information on or from a selected target sector 28 of a selected target track 30.

As represented in the cross-sectional view of FIG. 2B, the magnetic head 16 includes an upper head 16(n) locating above the magnetic disk 14 and a lower head 16(n-1) locating below the magnetic disk 14, wherein the upper and lower magnetic heads are floating from the respective, corresponding magnetic recording surfaces 26n and 26n-1 by a thin air film. By actuating the arm 24, the magnetic head 16 performs a seek operation across the tracks 30 from a first track to a next track.

In the magnetic disk device 1 of FIG. 1, it should be noted that the magnetic disk 14 in fact includes a plurality of magnetic disks held on the spindle motor 18 coaxially, and the swing arm 24 in fact includes a number of swing arms driven by the voice coil motor 20 as a unitary body. Thereby, the swing arms 24, and hence the magnetic heads 16 held thereon, scan over the corresponding magnetic disks 14 simultaneously.

The concentric tracks 30 thus formed on the magnetic recording surfaces collectively constitute a cylinder. Thus, a track on the recording surface 26n and a corresponding track on the recording surface 26n+1 form together a cylinder.

FIG. 3 shows an example of the seek operation of the magnetic head 16 after the magnetic head 16 has reached a target track or a target cylinder HD(n).

Referring to FIG. 3, the magnetic head 16 assumes a state $\hat{1}$ immediately after it reaches the target track HD(n), wherein it can be seen that the target sector or sectors, from which the information is to be read out, has or have already passed the position of the magnetic head 16.

Under such a situation, it has been practiced to hold the magnetic head 16 on the target track HD(n) until a situation $\hat{2}$ occurs in which the magnetic disk 14 makes another turn and the target sector or sectors comes to the position ready for scanning by the magnetic head 16 on the track HD(n). However, such a conventional seek control process inevitably wastes time and increases the seek time, and hence the access time, of the magnetic storage device.

In the conventional seek control of magnetic heads, a problem similar to the one explained with reference to FIG. 3 can occur also when there occurred a switching of the magnetic head 16 from the first magnetic head 16(n) scanning the first recording surface 26n of the magnetic disk 14 to the second, different magnetic head 16(n-1) scanning the second recording surface 26n-1 of the magnetic disk 14 as represented in FIG. 2B.

Referring to FIG. 4, there occurs a switching of the magnetic head 16 from a first magnetic head such as the magnetic head 16(0) scanning a track HD(0) on a first recording surface of the magnetic disk 14 to a second magnetic head 16(2) scanning a track HD(2) of a second recording surface of the magnetic disk 14, with a timing such that the second magnetic head 16(1) starts scanning of the first sector 0 of the track HD(1) in response to the completion of scanning of the last sector n of the first track HD(0).

In order to achieve such a successive cross over of the magnetic heads and hence the tracks, there is provided a predetermined skew between the tracks HD(0) and HD(1), so that the sector 0 of the track HD(0) comes to the position ready for scanning by the second magnetic head when the switching over is completed from the first magnetic head 16(0) to the second magnetic head 16(1) as represented in FIG. 4 by a broken line.

Thus, as long as the skew thus set is appropriate, the first and second magnetic heads 16(0) and 16(1) constituting collectively the magnetic head 16 successively reproduce information from the sector n of the track HD(0) on the first recording surface and then from the sector 0 of the track HD(1) on the second recording surface.

In the case the actual skew between the magnetic tracks HD(0) and HD(1) is different from the predetermined skew as represented in FIG. 4 by a continuous line, on the other hand, the second magnetic head 16(1) fails to scan the heading part of the target sector 0 of the target track HD(1) or may even skip the target sector 0 entirely. Thereby, it has been necessary for the second magnetic head 16(1) to wait on the track HD(1) until the magnetic disk 14 makes a further turn and the heading part of the target sector 0 returns again.

Further, such a waiting status may occur also in the seek operation of the magnetic head 16 scanning over the magnetic recording surface in a radial direction of the magnetic disk 14 by way of driving of the voice coil motor 20 in search of a target track. It should be noted that such a scanning of the magnetic head 16, which may be the magnetic head 16(n) scanning over the recording surface 26n, is controlled according to a reordering table that describes the seek order of various sectors of various tracks, determined in view of the seek time. Thus, when the content of the reordering table is inappropriate, the magnetic head may reach the target track and the target sector with a wrong timing and has to wait on the target track until the target sector comes to the position ready for reading by the magnetic head.

In the case the seek time in the reordering table is valid, the transition from a first track 30S to a second track 30T on the magnetic recording surface such as the recording surface 26n occurs just in time as represented in FIG. 5A, and the read command 1 specified by the reordering table and commanding the reading of a specified sector of the track 30S by the magnetic head 16(n) and the read command 2 specified also by the reordering table and commanding the reading of a specified sector of the target track 30T by the magnetic head 16(n), are executed consecutively without a waiting time.

In the case the seek time in the reordering table is inappropriate, on the other hand, the heading part of the target sector on the second target track 30T may have passed the location of the corresponding magnetic head 16(n) when the read command 2 is issued as represented in FIG. 5B. In such a case, it is necessary to hold the magnetic head 16(n) on the second target track 30T and wait for a further turn of the magnetic disk 14 until the heading part of the sector on the track 30T comes to the position ready for scanning by the magnetic head 16(n).

In any of these cases explained above, there appears a waiting time and the access speed of the magnetic disk device is deteriorated.

SUMMARY OF THE INVENTION

Accordingly, it is a general object of the present invention to provide a novel and useful magnetic disk device and a control process thereof wherein the foregoing problems are eliminated.

Another and more specific object of the present invention is to provide a magnetic disk device having a reduced access time and an access control process that reduces the access time.

Another object of the present invention is to provide a disk storage device storing information on a rotary recording disk, comprising:

a rotary recording disk;

one or more heads each scanning over a corresponding recording surface of said rotary recording disk generally in a radial direction of said rotary recording disk; and a control circuit controlling a scanning motion of said one or more heads such that said head scans a selected region of a selected track, said control circuit comprising a seek control circuit, said seek control circuit detecting occurrence of a waiting time in which said head waits on said selected track for a rotation of said rotary disk until said selected region comes to a position ready for scanning by said head, said seek control circuit further causing said head to scan a different part of said rotary disk different from said selected region during said waiting time.

Another object of the present invention is to provide a method of optimizing a seek operation of a disk storage device, comprising the steps of;

causing a seek operation in a first head to scan a first track;

detecting occurrence of a waiting time for said first head on said first track; and causing a second head, in response to a detection of occurrence of said waiting time, to scan a second track during an interval corresponding to said waiting time.

According to the present invention, the waiting time waiting for the magnetic disk to rotate until the selected sector comes to a position ready for scanning by the magnetic head is utilized for a useful purpose and the problem of occurrence of a loss time during the operation of the magnetic disk device is eliminated.

Another object of the present invention is to provide a disk storage device for storing information on a rotary recording disk, comprising:

a rotary recording disk;

first and second heads each scanning a corresponding recording surface of said rotary recording disk;

a control circuit controlling a scanning motion of said first and second heads such that said first head scans a selected region of a selected track, said control circuit comprising a seek control circuit, said seek control circuit detecting occurrence of a waiting time in which said first head waits on said selected track for a rotation of said rotary disk until said selected region comes to a position ready for scanning by said first head, and an optimizing circuit activated in response to occurrence of said waiting time, said optimizing unit driving said second head in response thereto and causing said second head to rewrite information on said second track with a skew, determined with respect to said first track, such that said waiting time vanishes substantially.

Another object of the present invention is to provide a method of optimizing a seek operation of a disk storage device, comprising the steps of;

causing a first head to scan a first track;

causing, after a scanning of said first track by said first head, a seek operation in a second head such that said second head scans a second track;

detecting occurrence of a waiting time for said second head on said second track; and rewriting said second track by using said second head, in response to a detection of occurrence of said waiting time, with a skew with respect to said first track, said skew being determined so as to eliminate said waiting time substantially.

According to the present invention, the skew between the tracks is optimized in conformity with the actual storage device, and further occurrence of the waiting time is eliminated. Thereby, further occurrence of waiting time is eliminated and the seek speed of the disk device is improved.

Another object of the present invention is to provide a disk storage device for storing information on a rotary recording disk, comprising:

a rotary recording disk;

a head scanning a recording surface of said rotary recording disk;

a control circuit controlling a scanning motion of said head such that said head scans a selected region of a selected track, said control circuit comprising a seek control circuit, said seek control circuit detecting occurrence of a waiting time in which said head waits on said selected track for a rotation of said rotary disk until said selected region comes to a position ready for scanning by said head, and an optimizing circuit activated in response to occurrence of said waiting time, said optimizing unit updating a seek time held in an reordering table, said reordering table specifying a seek order based on said seek time.

Another object of the present invention is to provide a method of optimizing a seek operation of a disk storage device, comprising the steps of:

causing a head to scan a first track;

causing, after a scanning of said first track by said head, a seek operation in said head such that said head scans a second track, said seek operation being conducted according to a seek order described in a reordering table, said reordering table including a seek time;

detecting occurrence of a waiting time for said head on said second track; and rewriting said seek time in said reordering table, in response to a detection of occurrence of said waiting time, such that said waiting time of said head on said second track is vanished.

According to the present invention, the reordering table controlling the seek order based on the seek time of the head across the tracks, is optimized in conformity with the actual state of the disk storage device. Thereby, further occurrence of waiting time is eliminated and the seek speed of the disk device is improved.

Other objects and further features of the present invention will become apparent from the following detailed description when read in conjunction with the attached drawings.

BRIEF DESCRIPTION OF THE DRAWINGS

FIGS. 13A and 13B are diagrams showing a seek operation of a magnetic disk device according to a fourth embodiment of the present invention;

FIGS. 14 and 15 are diagrams showing the seek control operation of the fourth embodiment in more detail;

DETAILED DESCRIPTION OF THE INVENTION

FIRST EMBODIMENT

Figure 6:
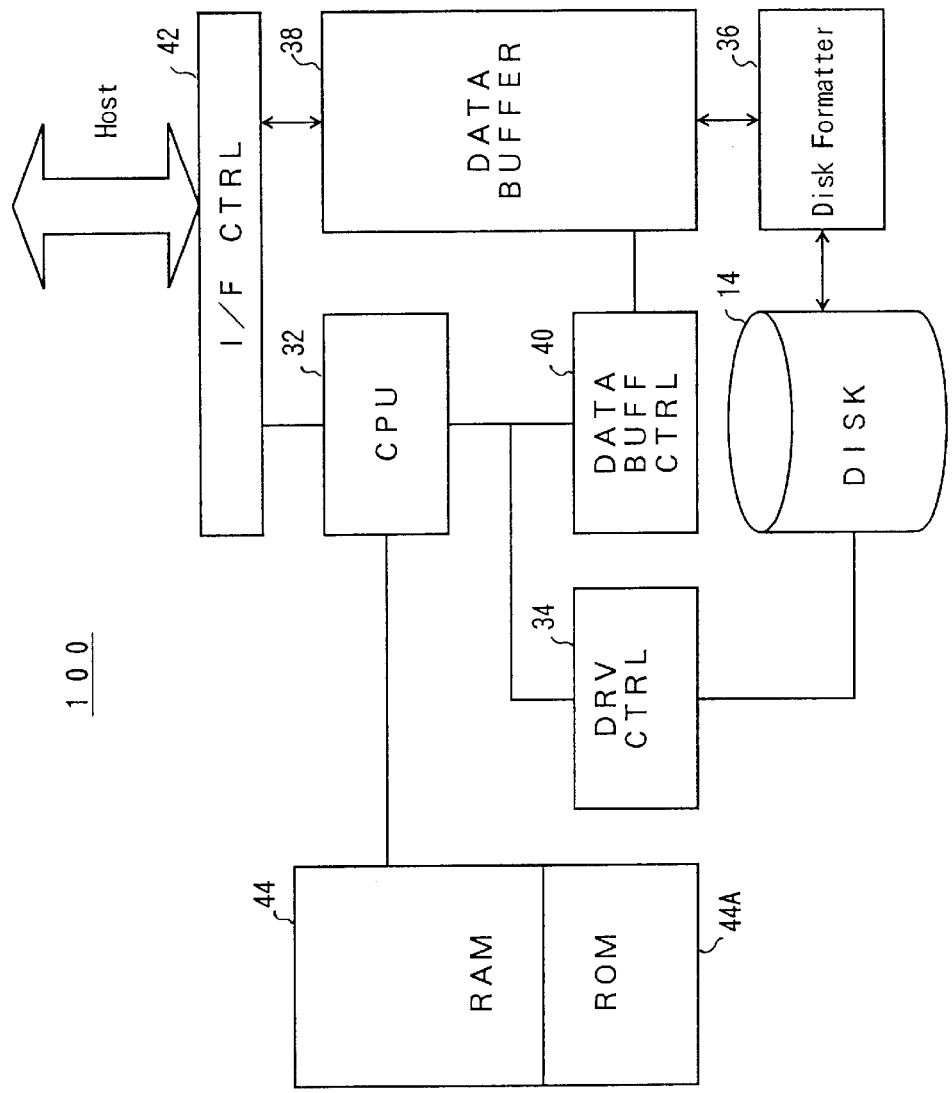
FIG. 6 is a diagram showing the construction of a control system of a magnetic disk device according to a first embodiment of the present invention.

FIG. 6 shows the construction of a control circuit 100 cooperating with the magnetic disk 14 in the magnetic disk device 1 according to a first embodiment of the present invention.

Referring to FIG. 6, the control circuit 100 includes a CPU 32 supervising the overall operation of the magnetic disk device 1, wherein the CPU 32 controls the operation of a drive control unit 34 that controls the spindle motor 18 and the voice coil motor 20. The control circuit 100 further includes a disk formatting unit 36 for formatting the magnetic disk 14, a data buffer unit 38 and a data buffer control circuit 40, wherein the data buffer unit 38 is interposed between an interface unit 42 and the disk formatter 36 and transfers the data supplied from an external host via the interface unit 42 to the magnetic disk 14 via the disk formatting unit 36 for writing under control of the data buffer control circuit 40. Further, data buffer unit 38 transfers the data read out from the magnetic disk 14 via the disk formatting unit 36 to the interface unit 42 under control of the data buffer control circuit 40, and the interface unit 42 transfers the data to the external host.

The foregoing operation of the data buffer control circuit 40 is supervised by CPU 32. In order to support the supervising operation of the CPU 32, the control circuit 100 includes a RAM 44 and a ROM 44A.

Figure 7:
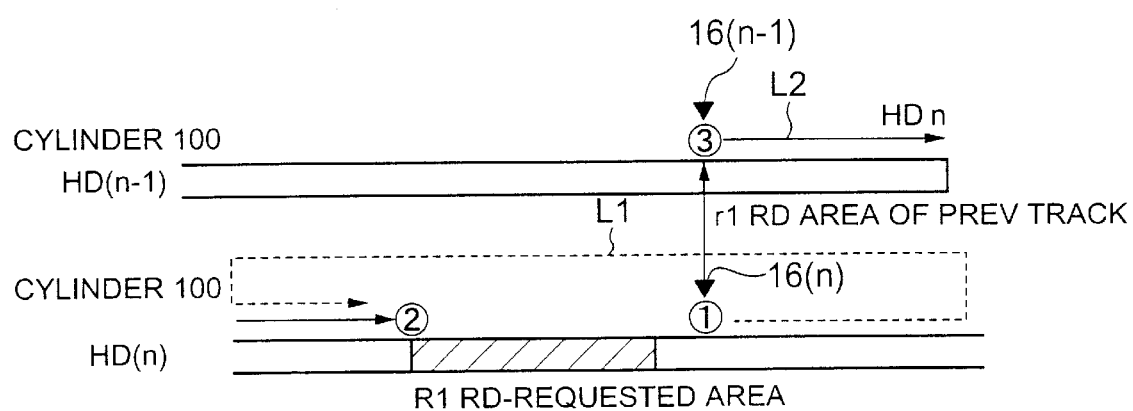
FIG. 7 is a diagram showing a seek operation according to the first embodiment.

FIG. 7 shows the state in which a waiting status has occurred in the seek operation of the control circuit 100 of FIG. 6.

Figure 1:
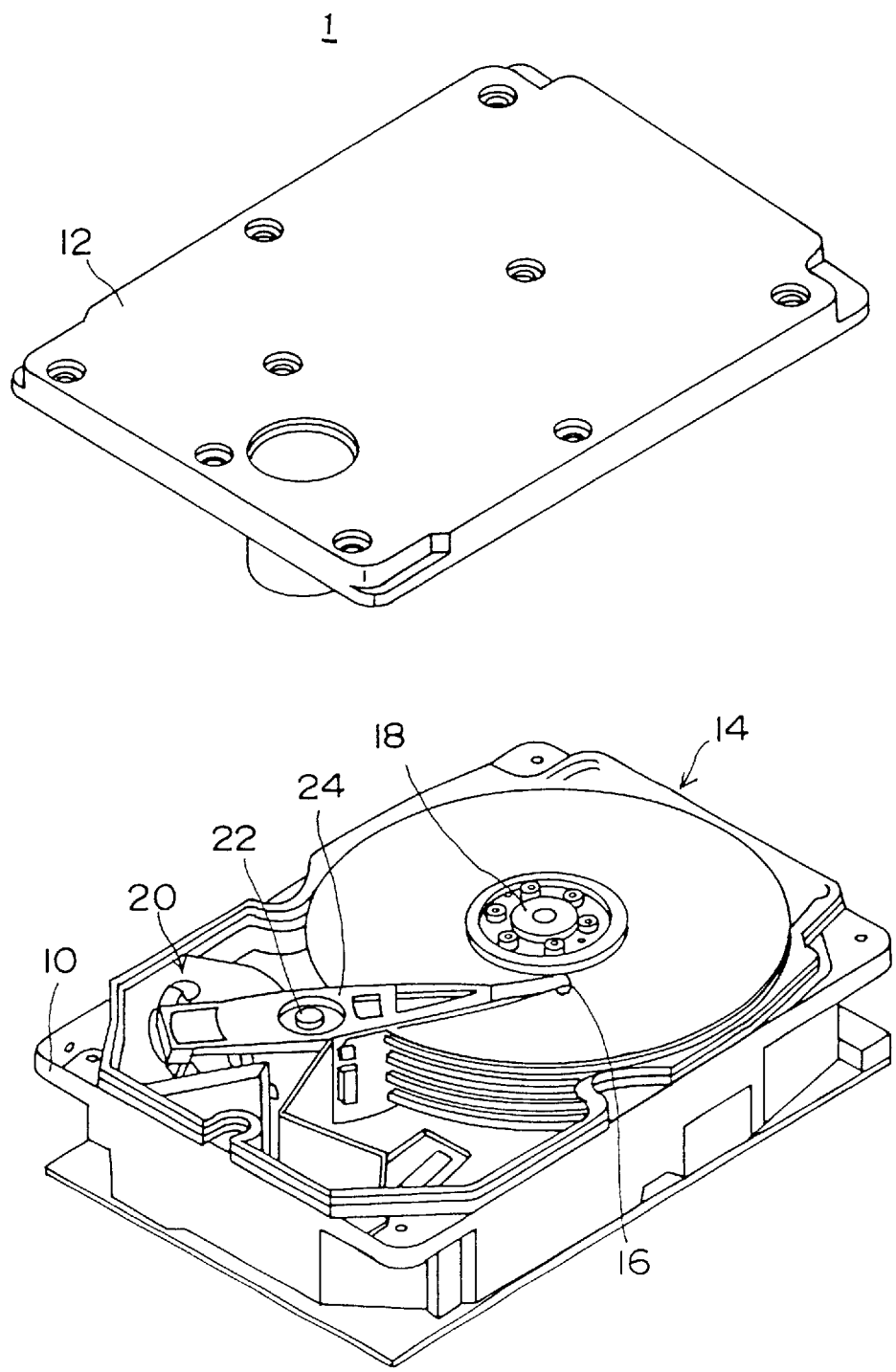
FIG. 1 is a diagram showing the construction of a magnetic disk device according to a related art.
Figure 2A:
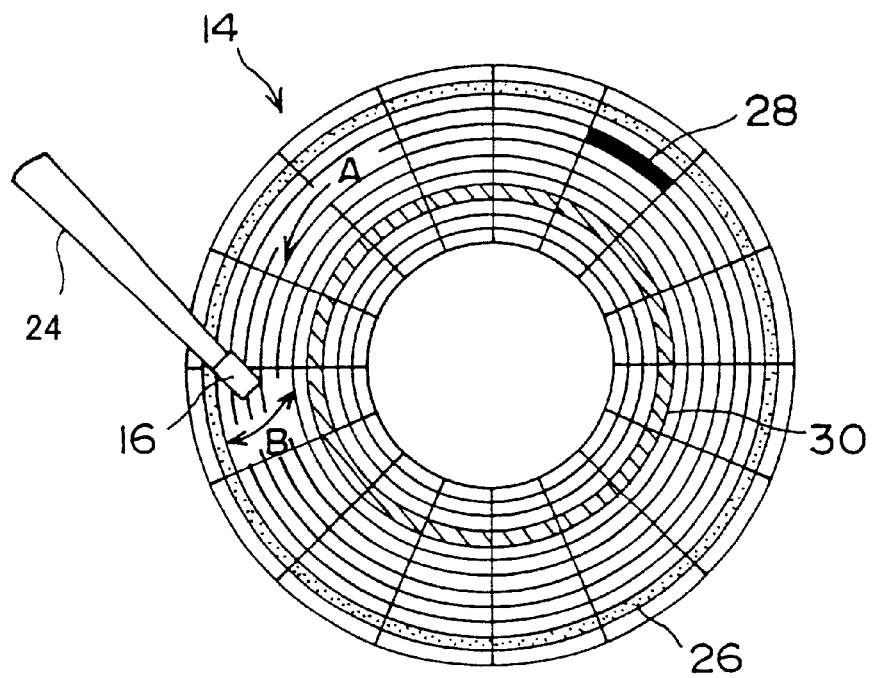
FIGS. 2A and 2B are diagrams showing a part of the magnetic disk device of FIG. 1 in detail.
Figure 2B:
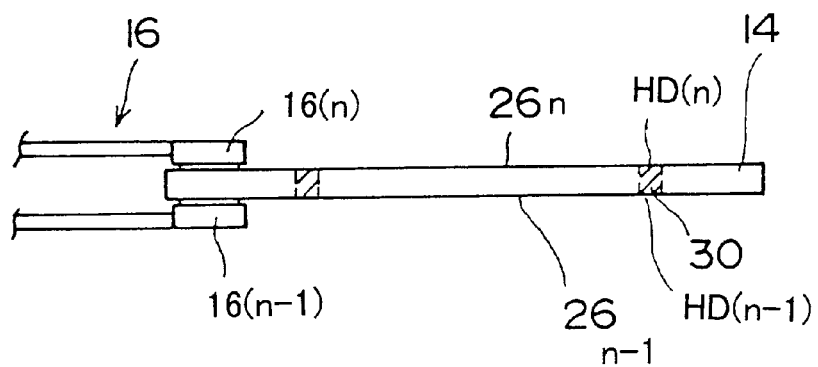
Figure 3:
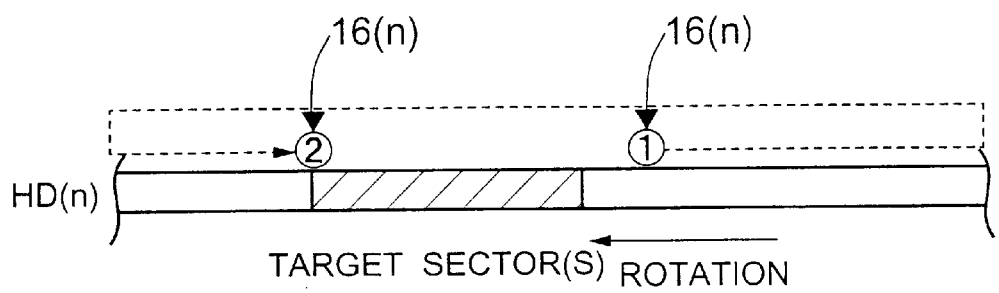
FIG. 3 is a diagram showing a seek operation conducted in the magnetic disk device according to a related art.
Figure 4:
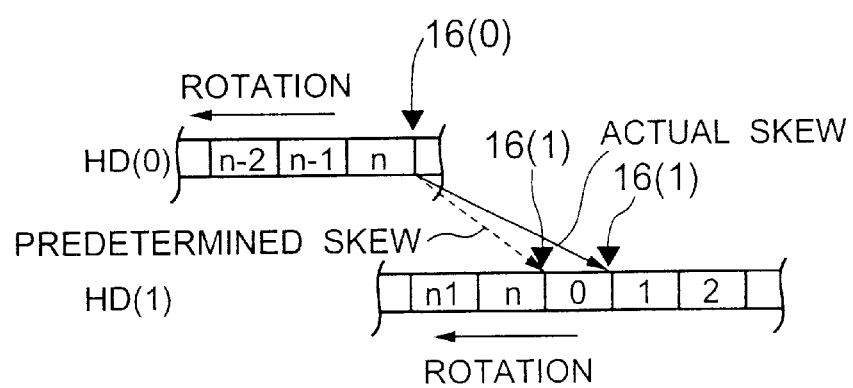
FIG. 4 is another diagram showing a seek operation conducted in the magnetic disk device according to a related art.

Referring to FIG. 7, it can be seen that a magnetic head, which may be the magnetic head 16(n) of FIG. 2B, has reached a target track HD(n) of a cylinder 100 formed on the magnetic recording surface 26n but has missed a target sector or sectors R1 on the track HD(n). Hereinafter, the part of the track HD(n) including the target sector or sectors R1 will be referred to as a region R1.

Thus, the magnetic head 16(n) is held on the tack HD(n) until the magnetic disk 14 makes a further turn as represented by a loop L1 and the heading part of the region R1 comes to the position ready for scanning by the magnetic head 16(n). Thus, there appears a waiting time.

In the present embodiment, the waiting time thus occurred is utilized effectively by activating the adjacent magnetic head 16(n−1) that scans a track HD(n−1) of the same cylinder as the track HD(n) on the recording surface 26n−1, wherein the magnetic head 16(n−1) thus activated scans a sector or succession of sectors r1 of the track HD(n−1). Again, the sector or succession of the sectors r1 of the track HD(n−1) will be referred to as a region r1. It should be noted that the track HD(n−1) has a track number smaller than the track number of the track HD(n) by one. The sector r1 of FIG. 7 may be a succession of sectors. Because the tracks HD(n) and HD(n−1) belong to the same cylinder, it is not necessary to move the arm 24 such that the magnetic head 16(n−1) scans the magnetic recording surface 26n−1 in the radial direction in search of the track HD(n−1).

The information thus read out by the magnetic head 16(n−1) from the sector r1 is cached in the data buffer unit 38, and when the sector R1 has come to the position ready for scanning by the magnetic head 16(n), the magnetic head 16(n−1) is switched over to the magnetic head 16(n) and reading of the sector R1 is carried out by using the magnetic head 16(n) thus activated. Thereby, the waiting time of the magnetic head 16(n) is not a loss time in the seek operation of the magnetic disk device of the present embodiment.

In the foregoing construction of the present embodiment, in which the information read out from the region r1 is cached in the data buffer unit 38, the data thus cached is read out from the data buffer unit 38 when the information is to be read out from the track HD(n−1) next time. Thereby, the time needed for scanning the track HD(n−1) by the magnetic head 16(n−1) is eliminated and the seek time is reduced.

Figure 8:
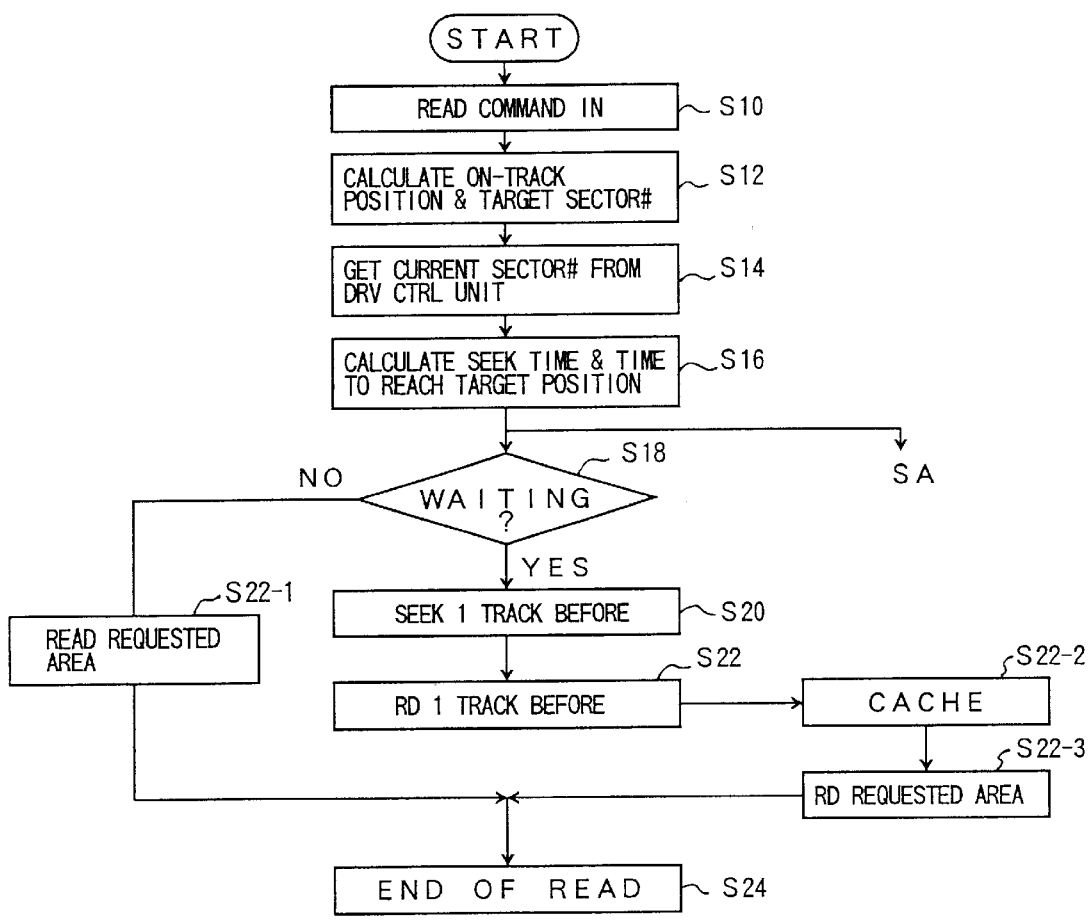
FIG. 8 is a flowchart showing the seek operation of FIG. 7.

FIG. 8 shows the foregoing seek operation of the present embodiment in detail.

Referring to FIG. 8, the seek operation is activated in response to a read command in the step S10 and the on-track position and the target sector number after the seek operation are calculated in the step S12.

Next, in the step S14, the current sector number is acquired from the drive control unit 34 and a calculation is made in the step S16 with regard to the seek time needed for the magnetic head 16(n) to reach the heading part of the region R1 of the target track HD(n).

Next, in the step S18, a discrimination is made whether or not there will be a waiting time, and if the result is NO, reading of the region R1 is conducted on the target track HD(n) in the step S22-1 as usual by using the magnetic head 16(n), and the seek operation is terminated in the step S24.

In the case the result of the step S18 is YES, on the other hand, the magnetic head 16(n−1) scanning over the previous track HD(n−1) is activated. As explained previously, the track HD(n−1) belongs to the same cylinder as the track HD(n). Thus, in the step S20, a read operation is conducted by the magnetic head 16(n−1) from the region r1 of the track HD(n−1), and the information thus read out by the magnetic head 16(n−1) is cached in the data buffer unit 38 in the step S22-2. After the step S22-2, the sector or sectors R1 of the target track HD(n) is scanned by the magnetic head 16(n) for reading information therefrom.

After the step S22-3, the seek operation is terminated in the step S24.

SECOND EMBODIMENT

Next, the seek control process according to a second embodiment of the present invention will be described with reference to FIGS. 9 and 10, wherein those parts corresponding to the parts described previously are designated by the same reference numerals and the description thereof will be omitted.

Figure 9:
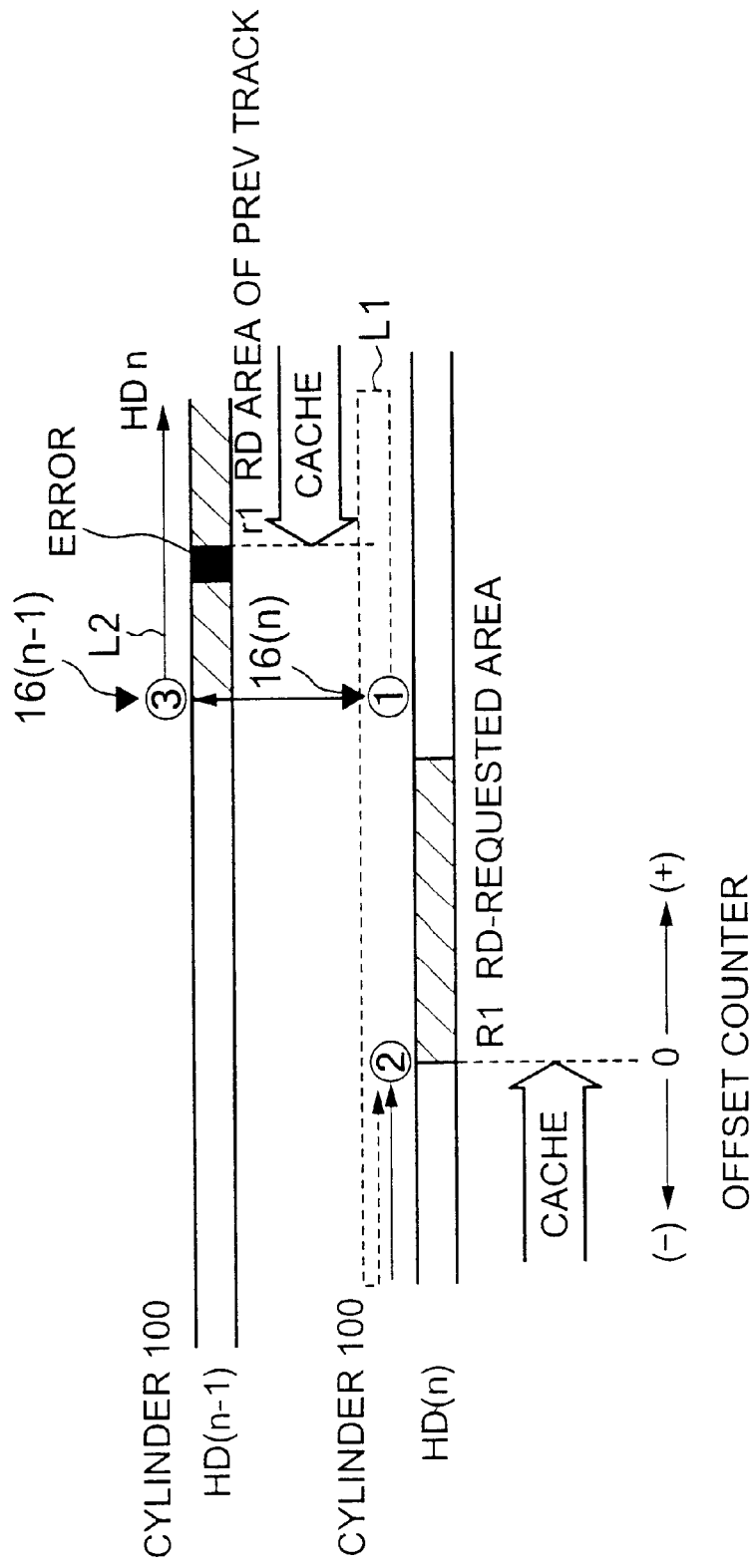
FIG. 9 is a diagram showing a seek operation of a magnetic disk device according to a second embodiment of the present invention.

Referring to FIG. 9, there arises a situation similar to that of FIG. 7 in that the magnetic head 16(n) aligned on the track HD(n) on the recording surface 26n has missed the region R1 and the magnetic head 16(n−1) is used to scan the region r1 of the track HD(n−1) on the recording surface 26n−1.

In the situation of FIG. 9, on the other hand, it should be noted that there occurred a reading error during the interval when the magnetic head 16(n−1) is reading the region r1 of the track HD(n−1). In such a case, the part of the information read from the region r1 before the error has occurred cannot be used due to discontinuity of the data content.

Thus, in the present embodiment, the CPU 32 of FIG. 6 invalidates the part of the information read from the region r1 of the track HD(n−1) before the occurrence of the error, while the CPU 32 validates the information that is read out from the region r1 after the occurrence of the error and the information thus read out is cached in the data buffer unit 38.

When an error has occurred during the interval in which the magnetic head 16(n) reads the information from the region R1 of the track HD(n), on the other hand, the CPU 32 carries out a routine error recovery process as usual. In order to discriminate whether the error has occurred during the interval reading the region r1 or during the interval reading the region R1, the CPU 32 is provided with an offset counter that has a positive count when the magnetic head 16(n) is used to read the region R1 and a negative count when the magnetic head 16(n−1) is used to read the region r1. The offset counter thereby takes a zero value at the beginning of the region R1.

Figure 10:
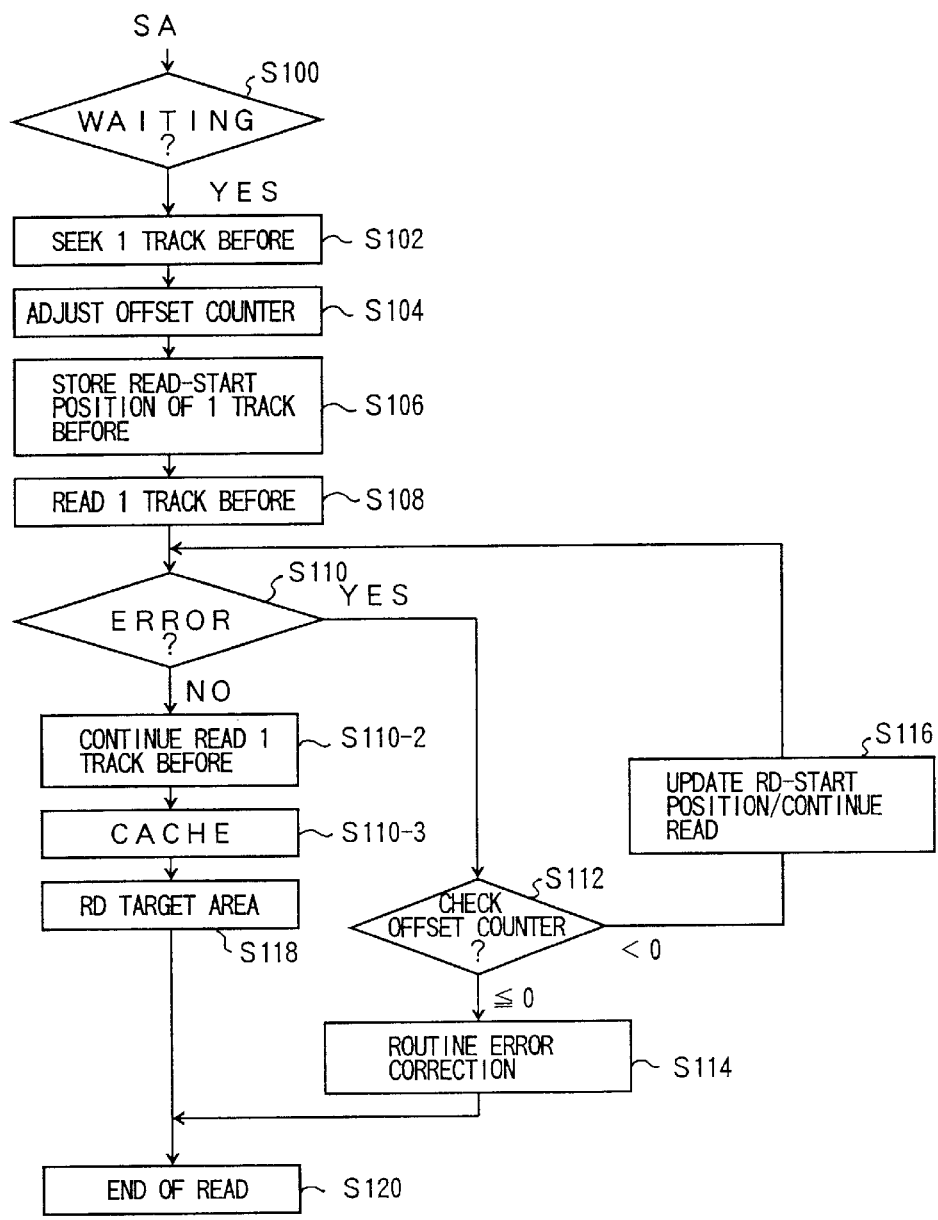
FIG. 10 is a flowchart showing the seek operation of FIG. 9.

FIG. 10 shows the control process according to the second embodiment of the present invention.

Referring to FIG. 10, the process starts with a step corresponding to the step S10 of FIG. 8 and proceeds to a step corresponding to the step S16 of FIG. 8. Thus, the description of these steps are omitted.

After the step corresponding to the step S16 of FIG. 8, a step S100 is conducted as represented in FIG. 10 wherein a discrimination is made whether or not there occurs a waiting time.

When the result of the discrimination step S100 is NO, the steps corresponding to the steps S22-1 and S24 are conducted similarly to the previous embodiment, while when the result is YES, the step S102 is conducted in which the magnetic head 16(n−1) scanning the track HD(n−1) is activated.

Next, in the step S104, the CPU 32 sets the offset counter therein such that the count value of the offset counter becomes zero at the beginning or heading part of the region R1.

Next, in the step S106, the beginning of the region r1 of the track HD(n−1) is stored in the RAM 44 in terms of the negative count value of the offset counter, and the region r1 is read by the head 16(n−1) in the next step S108.

Each time reading is made in the step S108, an examination is made in the step S110 whether or not an error has occurred. When no error detection was made in the step S110, the process proceeds to the step S110-2 and the reading of the track HD(n−1) is continued. The information thus read out from the region r1 of the track HD(n−1) is cached in the data buffer 38 in the step S110-3.

After the step S110-3, the region R1 of the track HD(0) is read in the step S118, and a terminating process is conducted in the step S120 upon completion of the process in the step S118.

In the event an error was detected in the step S110, on the other hand, the count value held in the offset counter is checked in the step S112. When the count of the offset counter is positive, this means that the error has occurred during the reading of the target region R1 of the track HD(n) and an ordinary error recovery process is conducted in the step S114.

When the value of the offset counter is negative, on the other hand, this means that the error has occurred during the reading of the region r1. Thus, the CPU 32 invalidates, in the step S116, the data read from the region r1 for the interval until the error has occurred, including the data corresponding to the moment the error has occurred. Thereby, only the part of the region r1 after the error is validated and the information corresponding to the validated part of the region r1 is cached in the data buffer unit 38. After the step S116, the process returns to the discrimination step S110 for further detection of error.

According to the present embodiment, the data read out from the region r1 of the previous track HD(n−1) during the waiting time of the magnetic head 16(n) is utilized efficiently even in such a case there occurs an error when the magnetic head 16(n−1) is reading the region r1.

THIRD EMBODIMENT

Next, the seek control process according to a third embodiment of the present invention will be described with reference to FIGS. 11 and 12, wherein those parts corresponding to the parts described previously are designated by the same reference numerals and the description thereof will be omitted.

The present embodiment is applied to the case in which the region R1 of the target track H(n) read by the magnetic head 16(n) is discontinuous and includes sub-regions Z1 and Z2 divided by an interval. During the interval, a magnetic head 16m other than the magnetic heads 16(n) is caused to scan a track HD(m) and read the information from a region C1 of the track HD(m).

Thus, in the normal operation of the magnetic disk of the present embodiment, the magnetic head 16(n) scanning the track HD(n) reads the subregion Z1 of the target region R1, and then the magnetic head 16m scanning the track HD(m) is caused to read the information from the region C1, wherein the information held on the region C1 continues from the information held on the sub-region Z1. After this, the magnetic head 16(n) is activated again and the information on the sub-region Z3 of the track HD(n) is read out by the magnetic head 16(n). The information on the sub-region Z3 continues from the information held on the region C1. Naturally, such a control process, including the switching of the magnetic head during the reading process of the region R1 takes a long time for reading out the desired information.

In the present embodiment, the waiting time, which appears when the magnetic head 16(n) has missed the region R1 of the track HD(n) is utilized effectively for reading the region C1 of the track HD(m) by the magnetic head 16m.

In order to achieve such a seek control in a magnetic disk device, it is necessary to grasp the waiting time and judge whether it is possible or not to complete the reading of the region C1 during the waiting time. Further, it is necessary to judge whether or not the reading process of the region R1 of the track HD(n) includes the scanning of the region Cl of the track HD(m). Further, it is necessary to judge that the entire reading process of the region R1 can be completed within the waiting time, including the seek operation of the magnetic head 16m for the region C1 of the track HD(m).

Figure 11:
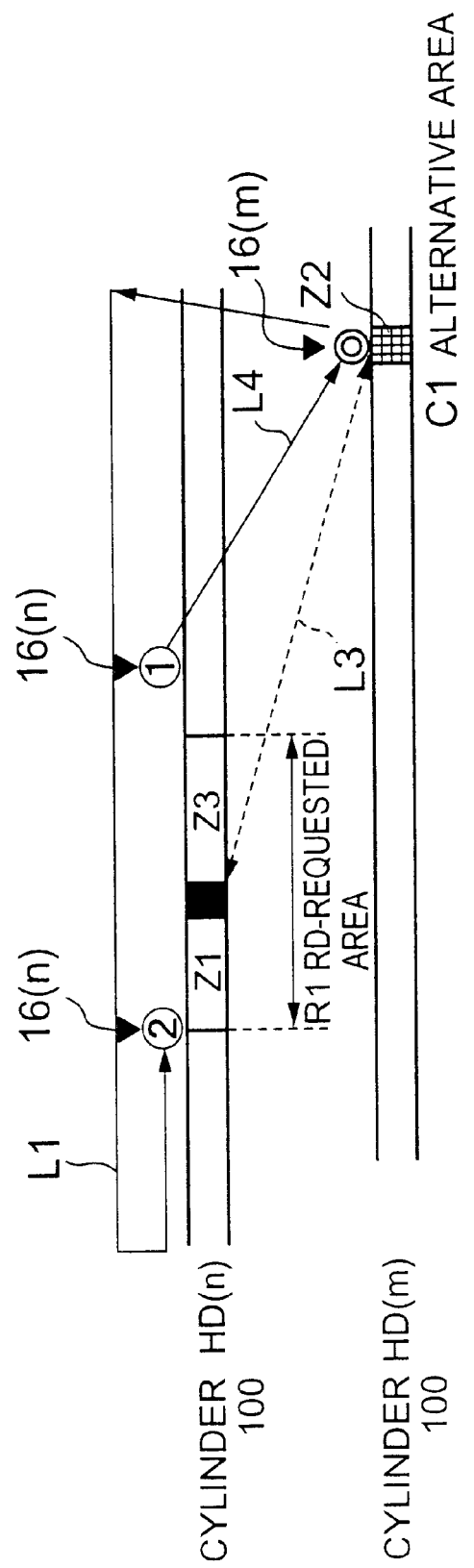
FIG. 11 is a diagram showing a seek operation of a magnetic disk device according to a third embodiment of the present invention.
Figure 12:
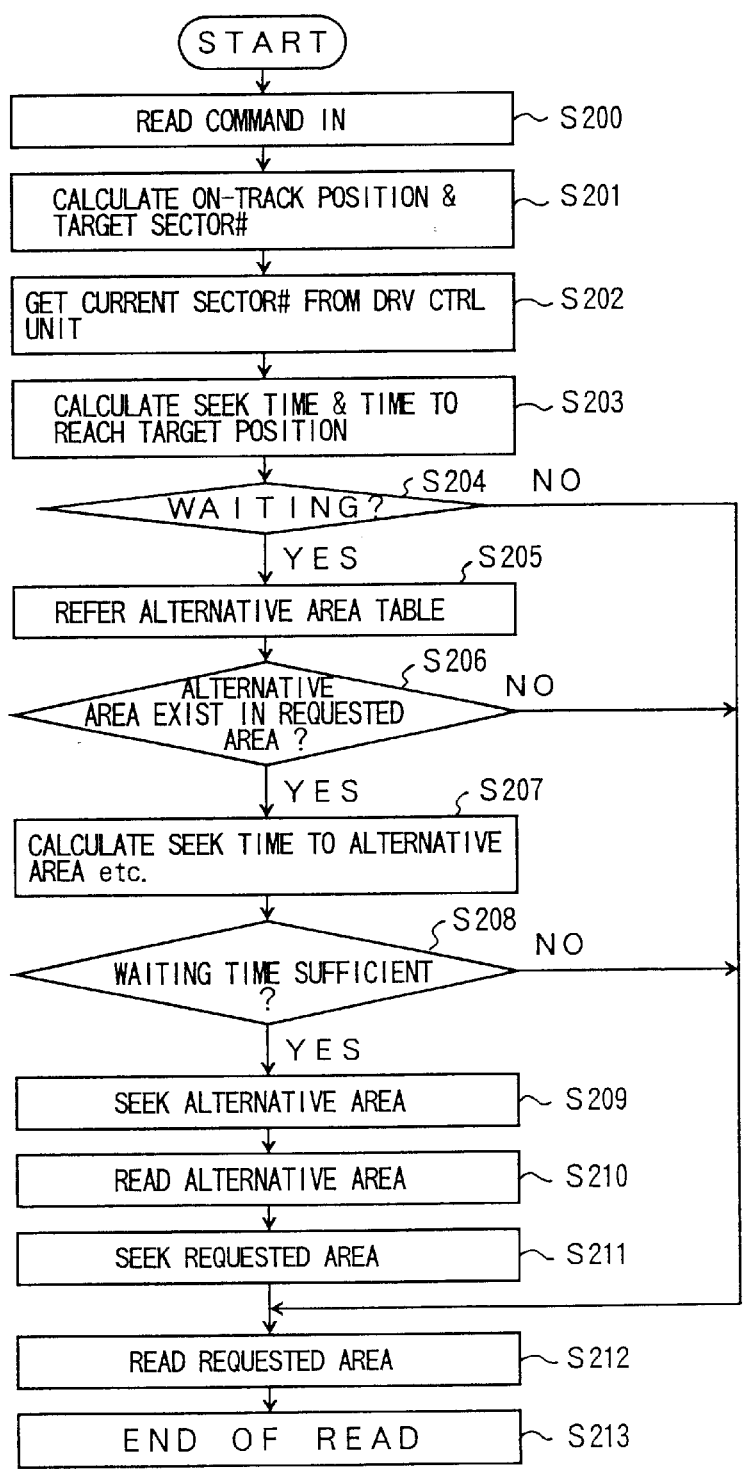
FIG. 12 is a flowchart showing the seek operation of FIG. 11.

FIG. 12 shows the flowchart of the seek operation of FIG. 11.

Referring to FIG. 12, the seek operation starts with the step S200 in which a read command is issued from the host device.

In response to the read command of the step S200, the step S201 is conducted in which the on-track position and the target sector number corresponding to the read command is calculated.

Next, in the step of S202, current sector number is acquired from the drive control unit 34, and the seek time and the time needed for the magnetic head such as the magnetic head 16(n) to reach the target position or the heading part of the region R1 of the track HD(n), is calculated in the step S203.

Next, in the step of S204, a discrimination is made, based on the result of the calculation made in the step S203, whether there will be a waiting time for the magnetic head 16(n). If the result of discrimination of the step S204 is NO, the process proceeds immediately to the step S212 and the region R1 is read by the magnetic head 16(n), including the switching over of the magnetic head from the head 16(n) to the head 16m for reading the region C1 during the reading process of the region R1. After the reading process of the step S212 is completed, a read terminating process is conducted in the step S213.

In the case the result of discrimination of the step S204 is YES, indicating that there will be a waiting time, on the other hand, the step S205 is conducted in which a table including a list of the jumping regions such as the region C1, which require a momentary switching of the magnetic head, is referred to, whether or not the target region R1 includes such a jumping region C1.

If there is no such a jumping region C1 included in the target region R1, the process proceeds to the step S212 for ordinary reading process. On the other hand, when there exists such a region C1, a seek time to the region C1 of the track HD(m), the time necessary for scanning the region C1, and the seek time for returning back to the region R1 of the track HD(n), are calculated in the step S207.

Further, a discrimination is made in the step S208 whether or not the waiting time is sufficient for reading the region C1.

When the result of discrimination of the step S208 is NO, the process proceeds to the step S212 immediately, while when the result of the step S208 is YES, a seek process is made for the jumping region C1 of the track HD(m) in the step S209 and the information on the region C1 is read by the magnetic head 16m in the step S210.

Further, in the step S211, the seek process for the region R1 is conducted and the process proceeds to the step S212.

Thus, according to the present embodiment, the waiting time, which occurs when a magnetic head has missed the heading part of a target region of a target track, is utilized efficiently for seeking and reading the jump region and the problem of occurrence of loss time is eliminated.

FOURTH EMBODIMENT

Next, the seek control process according to a fourth embodiment of the present invention will be described with reference to FIGS. 13A and 13B.

Referring to FIG. 13A showing the switching-over of the magnetic head from the head 16(0) scanning a track HD(0) to the magnetic head 16(1) scanning a track HD(1), it can be seen that the switching-over occurs upon completion of scanning of the magnetic head 16(0) of the sector n of the track HD(0) as represented by a broken line L5, wherein the sector n constitutes, together with previous sectors n-2, n-1, a target region corresponding to the region R1 of the previous embodiment from which the information is to be read out.

In view of the time necessary for causing the switching-over of the magnetic head from the head 16(0) to the head 16(1), the sectors on the magnetic track HD(1) is formed with a predetermined offset or skew with respect to the sectors on the track HD(0).

As long as the skew is appropriate, the magnetic head 16(1) is activated in response to the heading part of the sector 0 and there occurs no waiting time. When the skew is inappropriate, on the other hand, the magnetic head 16(1) misses the heading part of the sector 0. In the illustrated example, it can be seen that the magnetic head 16(1) has missed the sector 0 entirely. In such a case, it is necessary for the magnetic head 16(1) to wait for a further turn of the magnetic disk 14 until the heading part of the sector 0 returns to the position ready for scanning by the magnetic head 16(1), as represented in FIG. 13A by a broken line L6.

In order to eliminate the problem of occurrence of the waiting time as represented in FIG. 13A, the present embodiment carries out rewriting of the track HD(1) such that the sectors 0, 1, . . . n-2, n-1, n are aligned with respective sectors of the track HD(0) with an updated, optimized skew. In the case the predetermined skew is set larger than the switching-over time of the magnetic head and the magnetic head 16(1) is activated in response to the sector n or n-1 of the track HD(1) upon the switching-over, on the other hand, it is not necessary for the magnetic head 16(1) to wait for almost one further turn of the magnetic disk 14 but it is sufficient to wait for only one or two sectors until the heading part of the sector 0 is aligned with the magnetic head 16(1). In such a case, the rewriting of the track HD(1) is not necessary.

FIG. 14 shows the detection of the skew error conducted in the seek control process of the present embodiment.

Referring to FIG. 14 corresponding to FIGS. 13A and 13B, it can be seen that the track HD(1) of the cylinder 100 scanned by the magnetic head 16(1) is formed with a skew of 5 sectors with respect to the track HD(0) of the same cylinder 100 scanned by the magnetic head 16(0), such that the sector 0 on the track HD(1) is aligned with the sector 5 of the track HD(0).

In the seek operation, the magnetic head is switched from the head 16(0) to the head 16(1) upon completion of scanning of the magnetic head 16(0) over the final sector 300 of the track HD(0), wherein it can be seen that the magnetic head 16(1) scanning the track HD(1) is located on the sector 3, not the sector 0, of the track HD(1) when the switching over represented by the broken line L1 is completed.

Thus, there is a deviation or error of skew of 3 sectors, and the foregoing predetermined skew of 5 sectors should be increased by 3 in order to achieve an optimized skew of 8 sectors. In FIG. 14, it should be noted that the skew error is calculated by subtracting the predetermined skew from the actual skew according to the relationship

[SKEW ERROR]=[ACTUAL SKEW]−[PREDETERMINED SKEW]

and takes a positive value.

Figure 15:
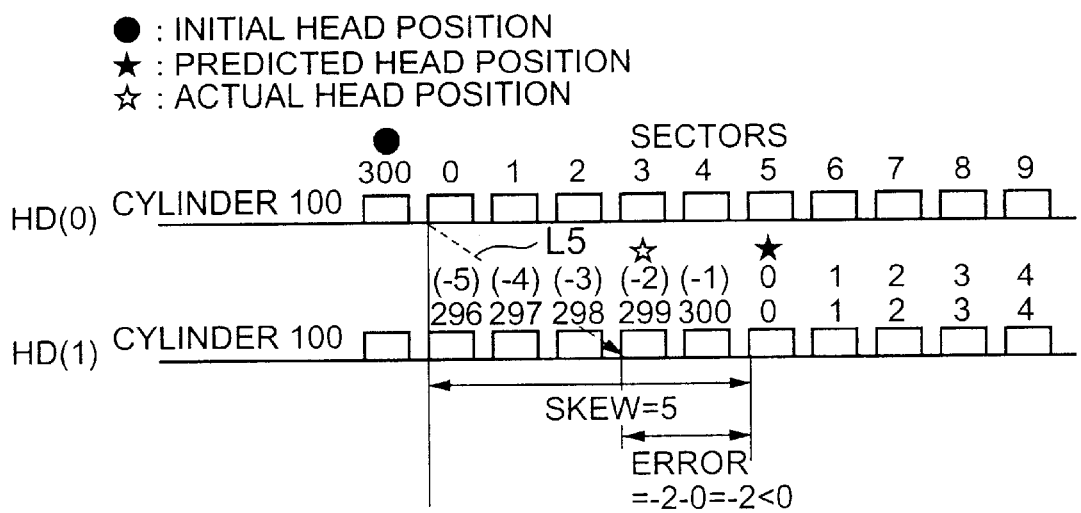

FIG. 15, on the other hand, shows the case in which the predetermined skew between the track HD(0) and the track HD(1) is set larger than the switching-over time of the magnetic heads.

Referring to FIG. 15, it can be seen that the rack HD(1) is formed with a predetermined skew of 5 sectors with respect to the track HD(0) similarly to the case of FIG. 14, wherein the magnetic head 16(1) scanning the track HD(1) of the cylinder 100 is located at the position of the sector 299 upon switching-over of the magnetic head from the head 16(0) to the head 16(1). In such a case, the error of skew takes a negative value of −2, and there is no substantial waiting time for the magnetic head 16(1) as the sector 0 of the track HD(1) is located only two sectors forward with respect to the heading part of the current sector 299.

When the predetermined skew is too large for the head switching-over time in the situation of FIG. 15 in which the skew error takes a negative value, on the other hand, it is desirable to redefine the sectors of the track HD(1) for minimizing the waiting time. Thus, when the magnitude of the skew error exceeds one-half of the total number of the sectors, in other words, when the absolute value of the negative skew error exceeds 150 (=300/2) in the case of the illustrated example, the sector numbers of the track HD(1) are reset by subtracting the value of one-half the total number of the sectors added with one (i.e., 150=300/2+1) from the sector number in each of the sectors.

Figure 16:
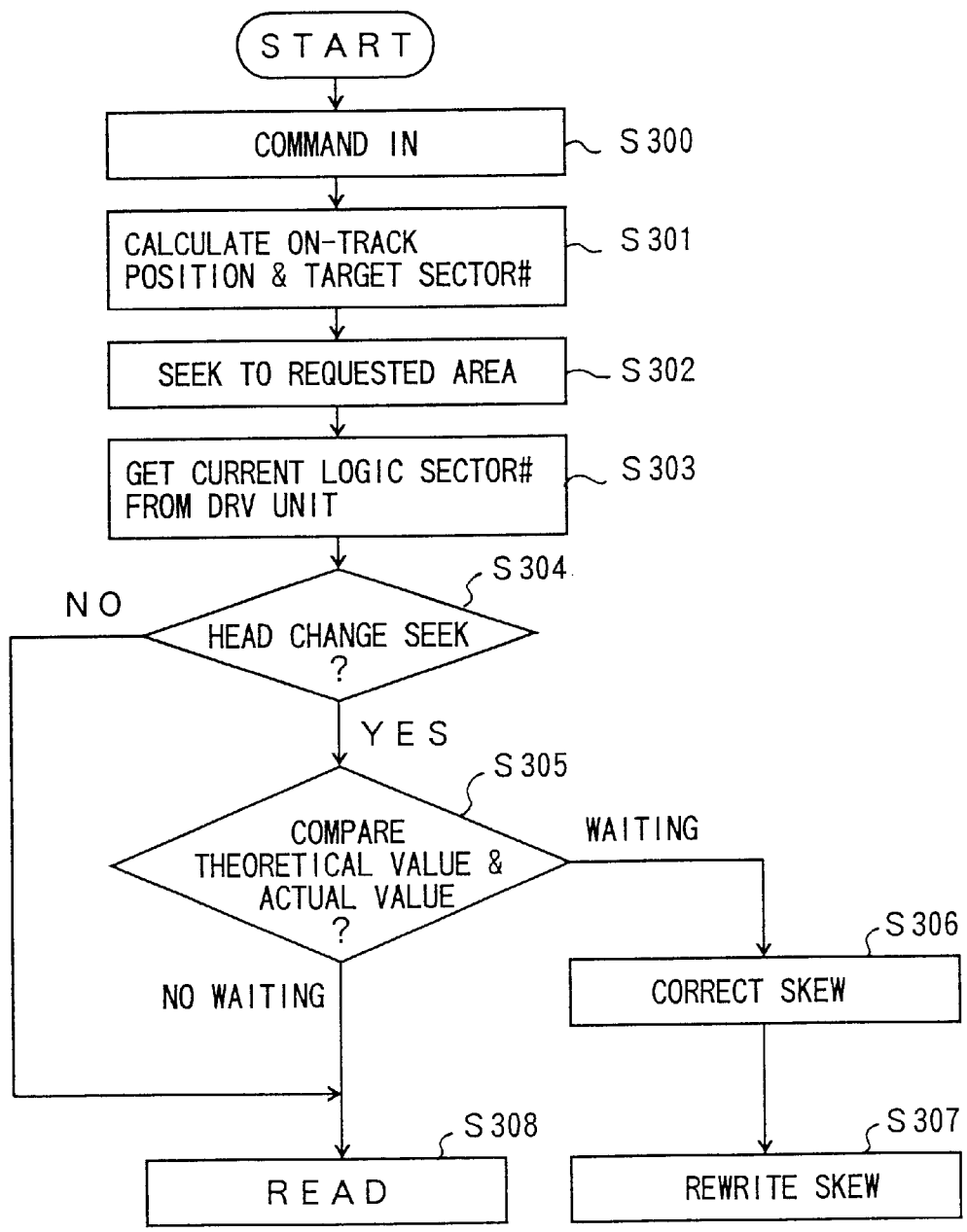
FIG. 16 is a flowchart showing the seek control operation of the fourth embodiment.

FIG. 16 shows the seek control operation of the fourth embodiment in the form of flowchart.

Referring to FIG. 16, a read command issued from a host device is detected in the step S300 and the head on-track position and the target sector number after the seek operation are calculated in the step S301.

Further, the step S302 is conducted in which a seek operation is made for the magnetic head such as the head 16(0) to the track and the sector calculated in the step S301. Thereby, the current logic sector number is acquired in the step S303 from the drive control unit 34.

Next, in the step S304, a discrimination is made whether or not the magnetic head should be changed from a first head, such as the head 16(0), to a second head, such as the head 16(1), for achieving the seek operation. If the result of the discrimination in the step S304 is NO, there is no change of the magnetic head and the magnetic head 16(0) is used to read the sectors of the track HD(0) in the step S308.

In the event the discrimination result of the step S304 is YES, indicating that there is a switching of the magnetic head from the head 16(0) to the head 16(1), on the other hand, a comparison is made between the predicted sector number and the actual sector number in the step S305 and a skew error is evaluated according to the equation described before. In the step 305, it is further discriminated whether the skew error thus obtained has a positive value or a negative value, and if it is discriminated that the skew error is negative, it is not necessary to update the skew and the process proceeds directly to the reading process of the step S308. Thus, in the step S308, the magnetic head 16(1) thus activated reads the sectors 0, 1, 2 and so forth on the track HD(1).

In the event the seek error detected in the step S305 takes a positive value, on the other hand, the step S306 is conducted for obtaining the updated skew value for the track HD(1). Thus, after the step S306, a step S307 is conducted in which the track HD(1) is rewritten with the sectors redefined for eliminating the skew error.

After the step S307, the process returns to the step S300 and the magnetic disk device waits for the next read command from the host device.

According to the present embodiment as described above, the loss time associated with the skew error is effectively eliminated and the read speed of the magnetic disk device is improved.

FIFTH EMBODIMENT

Figure 5A:
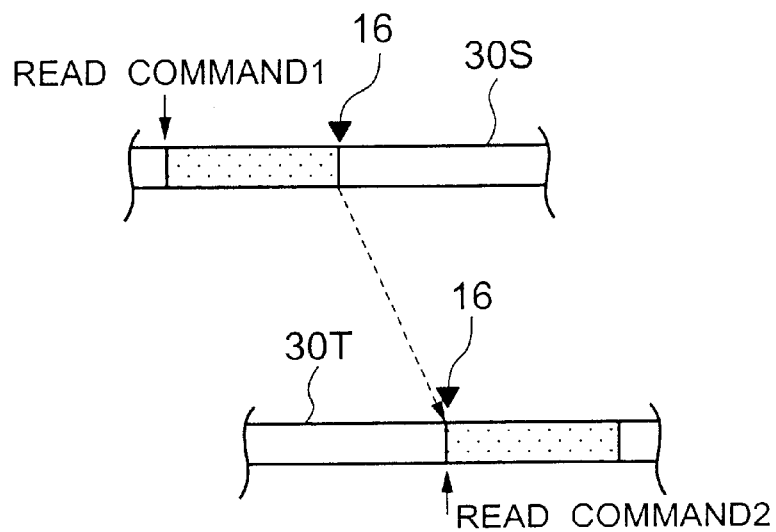
FIGS. 5A and 5B are further diagrams showing a seek operation in the magnetic disk device according to a related art.
Figure 5B:
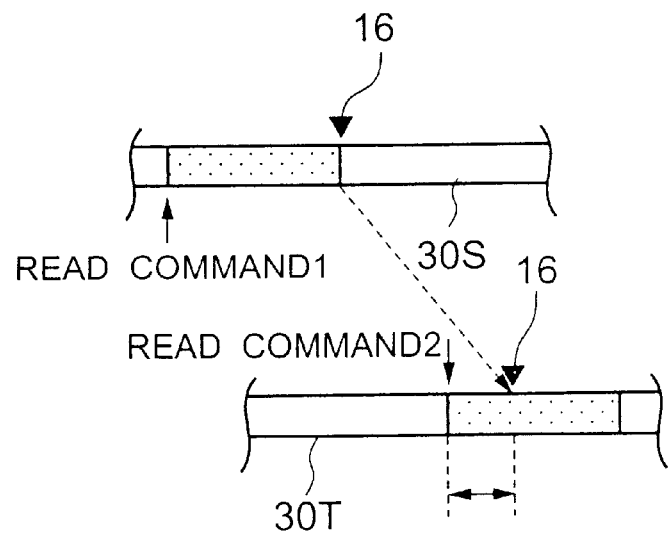
Figure 17A:
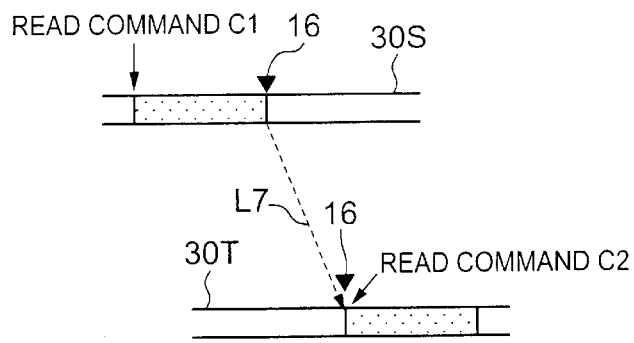
FIGS. 17A–17C are diagrams showing a seek control operation of a magnetic disk device according to a fifth embodiment of the present invention.

Next, the seek control according to a fifth embodiment of the present invention will be described with reference to FIGS. 17A–17C wherein FIGS. 17A and 17B correspond respectively to FIGS. 5A and 5B described before. Thus, the seek control of the present embodiment includes a driving of the voice coil motor 20 so that the magnetic head 16 scans across one or more cylinders, wherein such a seek control across cylinder(s) is carried out under control of the seek time described in a reordering table as described already with reference to FIGS. 5A and 5B. In the system of FIG. 6, the reordering table is held in a ROM 44A.

Thus, when the seek time described in the reordering table is proper, the magnetic head 16 jumps from the previous track 30S to the next track 30T and is aligned with the heading part of the target sector of the track 30T when a read command 2 commanding the reading of the target sector of the track 30T comes in. It should be noted that the read command 2 is the command that follows the read command 1 that has caused the magnetic head 16 to read the sector of the previous track 30S.

Figure 17B:
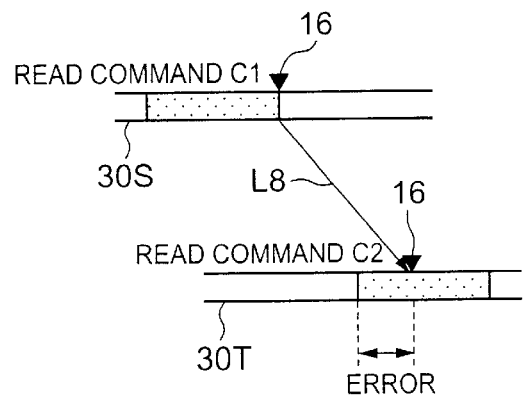

When the seek time in the reordering table is inappropriate, on the other hand, there can occur a situation represented in FIG. 17B in which the magnetic head 16 has passed the heading part of the target sector on the target track 30T when the read command 2 comes in. In such a case, the magnetic head 16 has to wait on the track 30T for further one turn of the magnetic disk 14 until the target sector comes in to the position ready for scanning by the magnetic head 16.

Figure 17C:
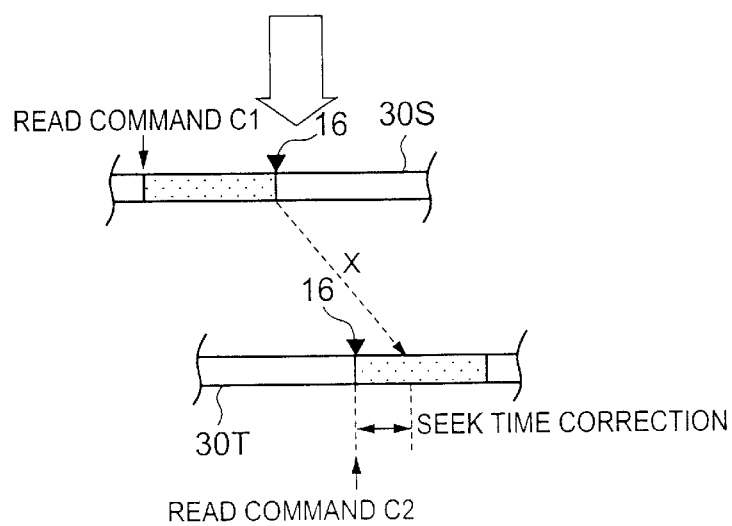

In order to eliminate this problem, the present embodiment updates, when the situation such as the one shown in FIG. 17B has occurred, the seek time held in the reordering table as represented in FIG. 17C, such that the reordering table holds the actual seek time thus obtained. Based on the actual seek time, the order of the read commands in the reordering table is recalculated.

Figure 18:
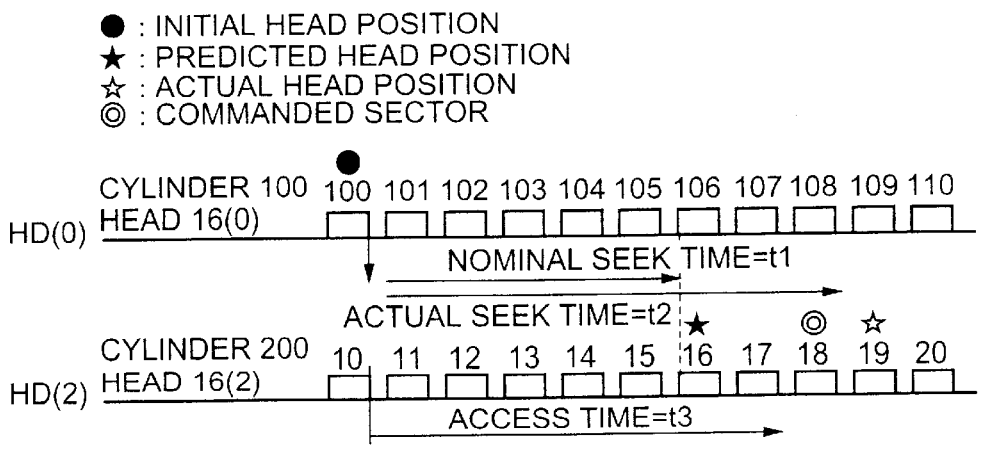
FIGS. 18 and 19 are diagrams showing the seek control operation of the fifth embodiment in more detail.

FIG. 18 shows the seek control of the present embodiment in more detail. In the case of FIG. 18, not only the cylinder is changed as a result of the seek operation but there also occurs a switching of the magnetic head from the head 16(0) to a head 16(2).

Referring to FIG. 18, it can be seen that the magnetic head 16(0) scans the track HD(0) of the cylinder 100 while the magnetic head 16(2) scans the track HD(2) belonging to the cylinder 200. The seek operation is started in response to a read command C1 from the state represented by ● in which the magnetic head 16(0) has just finished scanning of the sector 100 of the track HD(0) on the cylinder 100. In the illustrated example of FIG. 18, it should be noted that the next read command C2 orders the reading of the sector 18 of the track HD(2) on the cylinder 200. In order to execute the read command C2, it is necessary for the magnetic head 16(2) to reach the track HD(2) on the cylinder 200 before the foregoing sector 18, represented in FIG. 18 by ◎, comes to the position of the magnetic head 16(2).

According to the theoretical seek time used for constructing the reordering table, it is indicated that it takes a seek time t1 for the magnetic head HD(2) to reach the cylinder 200 and align with a sector 16, which is the sector locating before the target sector 18 by two sectors, as represented in FIG. 18 by ★. Thus, when the actual seek time is identical with the theoretical or nominal seek time t1, the magnetic head 16(2) is aligned on the tack HD(2) with the timing of the sector 16 and is ready for scanning the sector 18, which comes after the sector 16.

On the other hand, in the actual magnetic disk device, there can be a case in which the actual seek time t2 is longer than the nominal seek time t1 used for constructing the reordering table. In such a case, the magnetic head 16(2) can barely align on the track HD(2) with the timing of the sector 19 represented by ☆, which is the sector located after the target sector 18. Thus, as the target sector 18 has already passed the position of the magnetic head 16(2), it is necessary for the magnetic head 16(2) to wait on the track HD(2) not only for duration of the theoretical access time t3, which is a sum of the theoretical seek time t1 and the time needed for the magnetic head 16(2) to reach the target sector 18 by scanning the sectors 16 and 17, but also the duration corresponding to further full turn of the magnetic disk 14.

Thus, present embodiment modifies, when such a waiting time has occurred, the order of the commands described in the reordering table, such that another read command C3, which is supposed to be executed with the theoretical access time of t3, is executed before the foregoing read command C2.

Such a modification of the reordering table with regard to the order of the read commands C1, C2, C3, . . . is achieved by using the updated seek time. By using the updated seek time for the read command C2, for example, it is correctly recognized that the read command C3 having the access time of t3 should be executed before the read command C2 of which access time is the sum of the access time t2 and the duration for almost one full turn of the magnetic disk.

Figure 19:
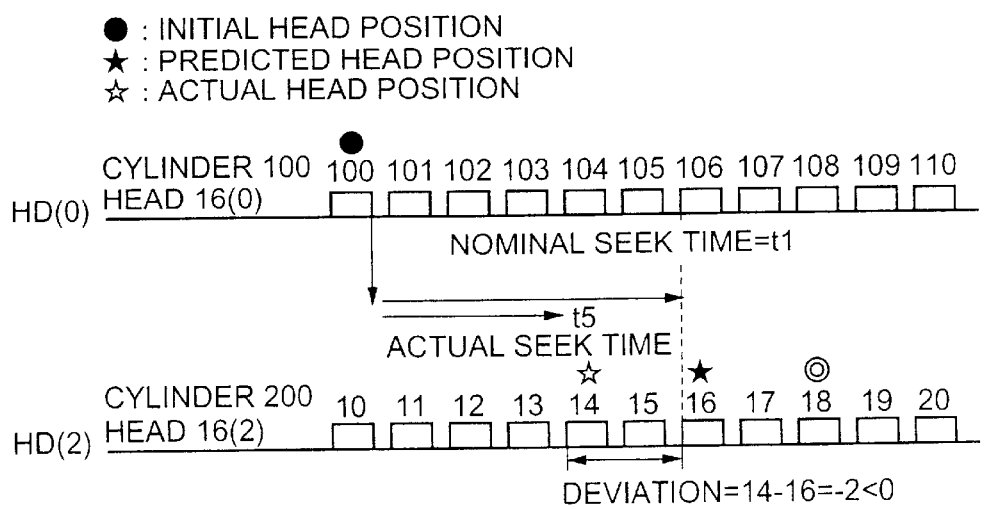

FIG. 19 shows the case in which there is an actual seek time t5 smaller than the nominal seek time t1. In such a case, the magnetic head 16(2) is aligned on the track HD(2) with the timing of the sector 14 as represented in FIG. 19 by ☆, and it is not necessary to update the reordering table. In the case of FIG. 19, it can be seen that the timing deviation of the magnetic head HD16(2) on the track HD(2), represented as [actual sector number]–[nominal sector number], takes a negative value.

Figure 20:
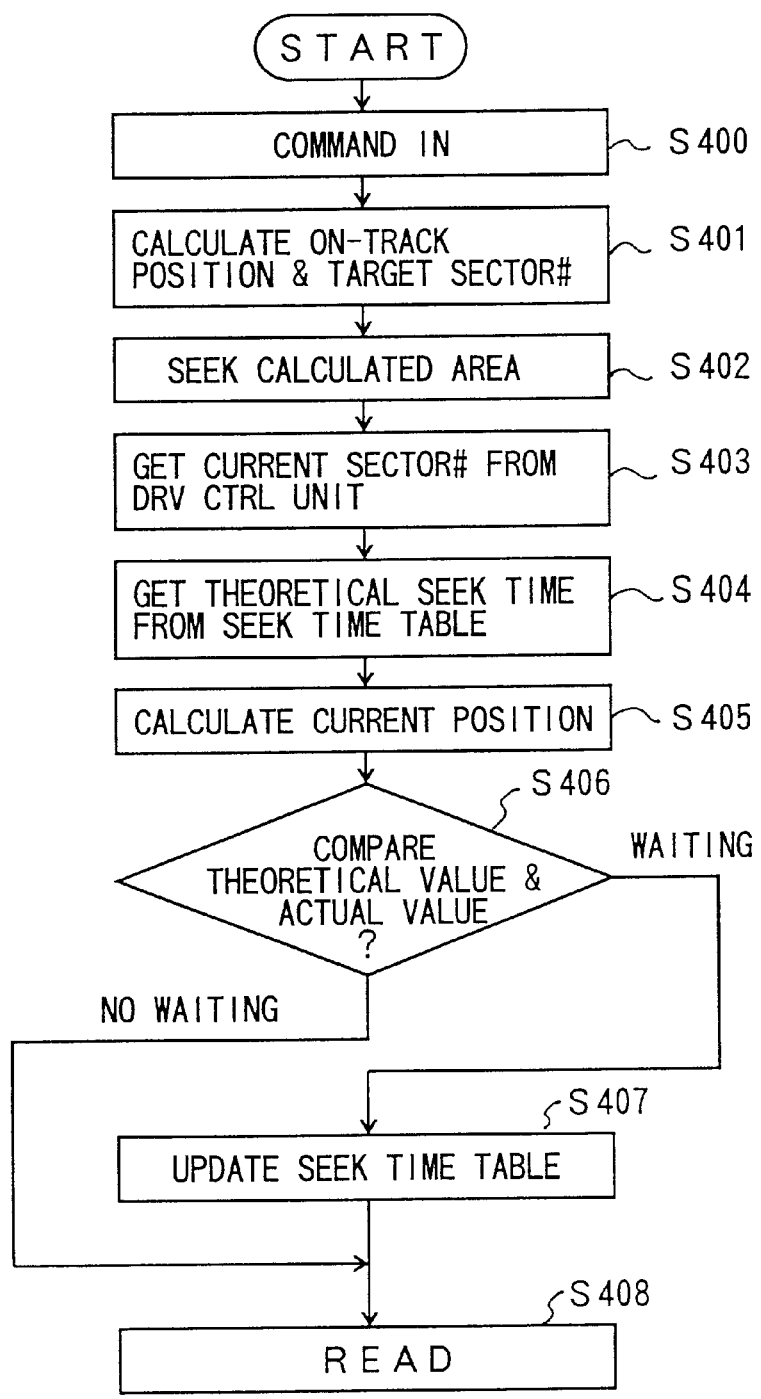
FIG. 20 is a flowchart showing the seek control operation of the fifth embodiment.

FIG. 20 shows the seek control process according to the present embodiment in the form of a flowchart.

Referring to FIG. 20, a read command is issued from a host device in the step S400 and the on-track position and the target sector corresponding to the read command are calculated in the step S401.

Next, in the step S402, the magnetic head is caused to seek the region specified by the calculation in the step S401, and the current sector number is acquired from the drive control unit 34 in the step S403.

Next, in the step S404, the reordering table is referred for the nominal seek time needed for a seek operation and the nominal head position is calculated in the step S404 based on the nominal seek time acquired in the step S404. In the step S405, it should be noted that the actual seek time is already obtained in the step S402 in which the magnetic head is caused to seek the target region.

Next, in the step S406, the nominal head position and the actual head position are compared and it is discriminated whether there will be a waiting time.

If the result of discrimination of the step S406 is NO, the reading of the region is conducted in the step S408 in corresponding to the situation shown in FIG. 19.

In the event there is a waiting time in the step S406, the reordering table is updated in the step S407 as noted before, and the reading process is conducted in the step S408.

According to the present embodiment, the seek operation is conducted by referring to the updated reordering table updated based on the actual seek time, and the problem of occurrence of waiting time and associated problem of occurrence of loss time in the seek operation of the magnetic disk device, are effectively eliminated.

Further, the present invention is not limited to the embodiments described heretofore, but various variations and modifications may be made without departing form the scope of the invention.

For example, the seek control of the present invention is applicable also when writing information on a magnetic disk. Further, the seek control of the present invention is applicable not only to magnetic disk devices but also to optical disk devices that store information on a rotary optical or magneto-optical disk.

What is claimed is:

1. A disk storage device storing information on a rotary recording disk, comprising:

a rotary recording disk;

a plurality of heads each scanning over a corresponding recording surface of said rotary recording disk generally in a radial direction of said rotary recording disk; and a control circuit controlling a scanning motion of said heads such that one of said heads scans a selected region of a selected track, said control circuit comprising a seek control circuit, said seek control circuit detecting occurrence of a waiting time in which said one of said heads waits on said selected track for a rotation of said rotary disk until said selected region comes to a position ready for scanning by said head, said seek control circuit further causing another head to scan a different part of said rotary disk different from said selected region during said waiting time, said control circuit further causing said another head to read data from said different part of said rotary disk during said waiting time as said another head scans over said different part and caching said data in a buffer memory.

2. A disk storage device as claimed in claim 1, wherein said one head and said another head scan first and second tracks on said recording disk respectively, said seek control circuit detecting occurrence of said waiting time during an interval in which said one head scans said selected region, said seek control circuit switching from said one head to said another head in response to occurrence of said waiting time, said another head thereby scanning said different part of said rotary disk during said waiting time.

3. A disk storage device as claimed in claim 2, wherein said another head reads said different part on said second track during said waiting time of said one head and said control circuit caches data thus read by said another head.

4. A disk storage device as claimed in claim 1, wherein said selected region and said different part belong to a common cylinder on said recording disk.

5. A disk storage device as claimed in claim 4, wherein said selected region and said different part belong to respective first and second tracks having consecutive track numbers.

6. A disk storage device as claimed in claim 1, wherein said seek control circuit monitors for occurrence of an error and invalidates information read out from said different part before the occurrence of said error.

7. A method of optimizing a seek operation of a disk storage device, comprising the steps of;

causing a seek operation in a first head to scan a first track;

detecting occurrence of a waiting time for said first head on said first track; and causing a second head, in response to a detection of occurrence of said waiting time, to scan a second track during an interval corresponding to said waiting time.

8. A method as claimed in claim 7, wherein said first track and said second track belong to a common cylinder of said disk, said first and second tracks having respective and consecutive track numbers.

9. A method as claimed in claim 7, further comprising the steps of: monitoring an occurrence of an error during said interval in which said second head is scanning said second track; and invalidating information read by said second head from said second track for a part of said interval before said occurrence of said error.

* * * * *